UNITED STATES PATENT OFFICE.

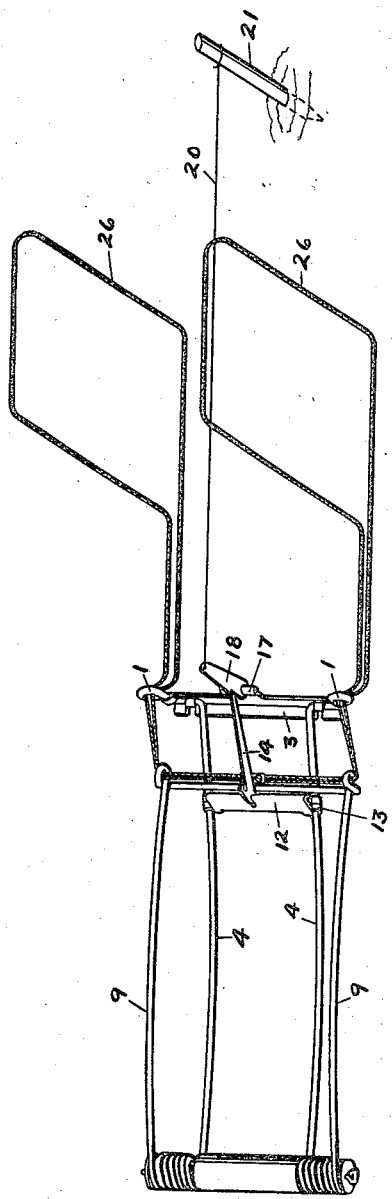
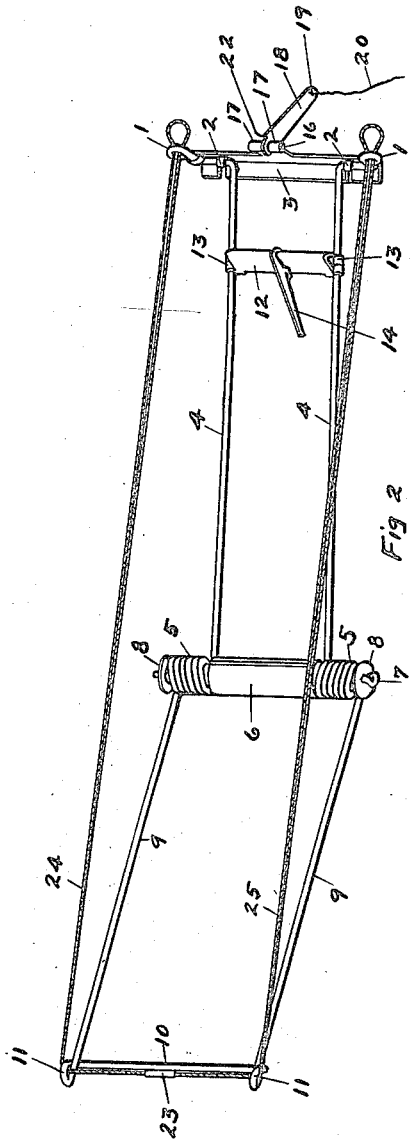

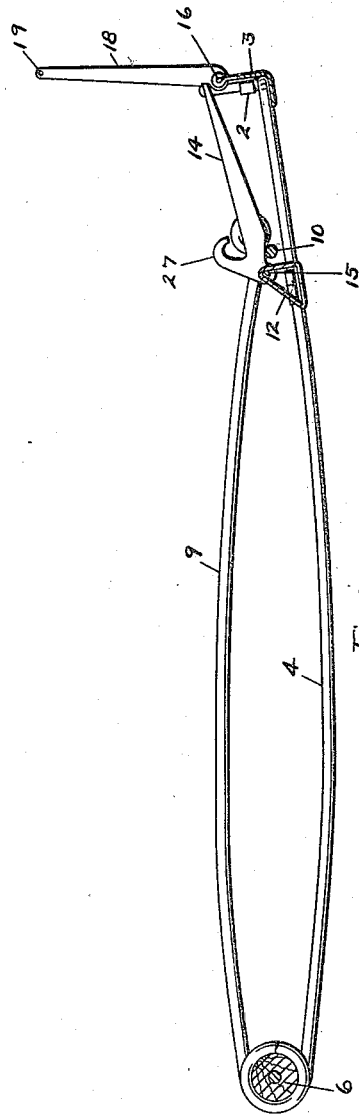
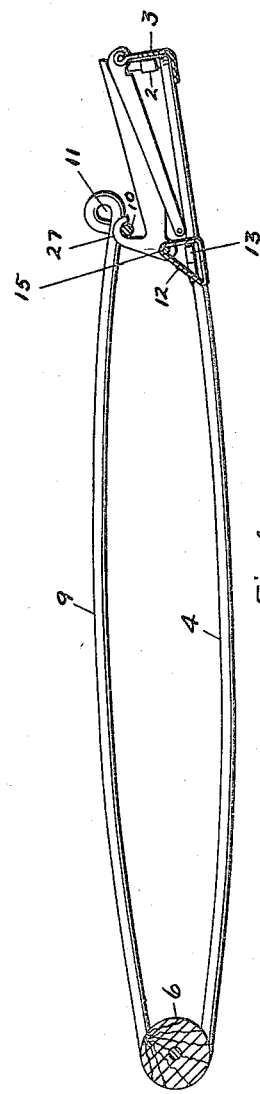

WILLIAM DUNN, OF BANNACK, MONTANA.

ANIMAL TRAP.

1,422,424.  Specification of Letters Patent.  Patented July 11, 1922.

Application filed December 24, 1920. Serial No. 432,898.

*To all whom it may concern:*

Be it known that I, WILLIAM DUNN, a citizen of the United States, residing in the town of Bannack, in the county of Beaverhead and State of Montana, have invented certain new and useful Improvements in Animal Traps, of which the following is a specification.

The principal object of my invention is to provide a simple and efficient trap for catching small fur-bearing animals. The trap is simple in construction and quick and sure in operation.

In the accompanying drawings, Figure 1 is a perspective view of the trap before it has been sprung. Figure 2 is a perspective view of the trap after it has been sprung. Figure 3 is a sectional side view of the main frame of the trap, set ready to trip. And Figure 4 is a sectional side view of the main frame of the trap, closed for handling.

Throughout the specification and drawings, similar reference characters denote corresponding parts.

Referring to the accompanying drawings, the main frame of the trap is preferably made of a single piece of spring wire formed as follows. The free ends of the wire terminate in right angled eye pieces 1, 1 to which are secured by loops 2, 2, a transverse trigger support 3. After making right angled bends, the ends of the wire project inwardly in two parallel straight portions 4, 4 which form the support for the trap when it is on the ground. These straight portions 4, 4 of the wire, a substantial distance from their ends, are looped to form helical spring portions 5, 5 through which projects an arbor 6 preferably made of wood. Passing through the arbor 6 is an eye bolt 7, which receives on each end a washer 8 to hold the spring portions 5, 5 on the arbor ends, which are turned down. (See Figures 1 and 2.) The eye bolt 7 is adapted to receive a rope or chain (not shown) by means of which the trap may be tied to a tree or other object.

The wire projects rearwardly from its helical spring portions 5, 5 in two straight parallel parts 9, 9 which are looped to form a transverse end portion 10 having two closed eyes 11, 11. (See Figures 2 and 4.)

Secured between the straight portions 4, 4 of the wire near its ends 1, 1, is a transverse supporting piece 12 preferably triangular in cross-section and which has hook-shaped ends 13, 13 which grip the straight portions 4, 4 of the wire to hold the supporting piece 12 firmly thereon. The upper edge portion of the triangular supporting piece 12 is slotted at its middle to receive the end of a locking bar 14 loosely mounted on a pin 15 welded or otherwise secured within the top portion of the supporting piece 12.

Mounted on a pin 16 which is secured in two up-turned hook portions 17, 17 of the trigger support 3, is a trigger 18 which has a hole 19 in its outer end to receive a trip cord 20 adapted to be tied to a stake 21 or other object. In the edge portion of the trigger 18, adjacent to the locking bar 14, is a notch 22 into which the free end of the locking bar is adapted to project, as shown in Figures 1 and 3.

Secured together by a clamp 23 between the closed eyes 11, 11 of the spring, are the four ends of two cables 24 and 25 preferably constructed of flexible steel. The two ends of each cable pass through an eye 11 and an eye 1 on its respective side of the trap. When the trap is set, the cables 24 and 25 are formed, beyond the eyes 1, 1 of the wire, into preferably square loops 26, 26, as shown in Figure 1.

In operation, the trap is set as follows. First, the transverse end portion 10 of the frame is rotated to a position adjacent the triangular supporting piece 12, thereby placing the helical spring portions 5, 5 under torsion, and the straight portions 4, 4 and 9, 9 under bending strain. The locking bar 14 is then passed over the center of the transverse end piece 10 and secured in the notch 22 in the trigger 18. This holds the trap in its closed position.

The looped ends of the cables 24 and 25 are then drawn through the eyes 1, 1 and formed into substantially square loops 26, 26 over a trail frequented by the animals which it is desired to entrap. The trip cord is stretched taut between the looped cables and secured to a rigid support on the opposite side of the trail. An animal passing along the trail in either direction, will pass through one or the other of the cable loops and strike the trip cord 20 with some part of its body. Any movement of the trip cord will move the trigger 18 out of engagement with the locking bar 14 and release the transverse end portion 10 of the trap frame.

The trap frame being in a position of strain, will tend to assume the position shown in Figure 2. The relative movement of the eyes 11, 11 and 1, 1 will draw the cables 24 and 25 through the eyes 1, 1, thus shortening the length of the cable in the looped ends. As the loops decrease in size, some part of the body of the animal will be surrounded by one or both loops. The animal will then be drawn against the eyes 1, 1 and held securely.

The cable clamp 23 will not pass through the eyes 11, 11. Should the animal only be caught by one loop 26, the cable would be drawn through the eyes 11, 11 until the cable clamp rests against one or the other of the eyes 11, 11, thereby placing the strain of the spring on a single loop. Should the animal be caught around a larger part of its body by one loop and a smaller part such as one leg, by the other loop, then the cable clamp will move to one side or the other between the eyes 11, 11, compensating for the difference in length of the looped ends and placing an equal strain on each loop to hold the animal.

It will be observed that the trap when set is at one side of the trail and the cable loops are the only portions placed on the trail proper. This does not disturb the trail, and so causes the animal to abandon the trail or go around the trap.

The locking bar 14 carries on its inner end a hooked portion 27 adapted to engage the transverse end portion 10 to hold the main frame of the trap in a closed position. This reduces the trap to a small bulk and permits of ease in transportation. The main frame is shown locked in this position in Figure 4.

Having described my invention, I claim:

1. In an animal trap, the combination with a frame, one portion of which is adapted to be bent upon the other part, of locking means for holding it in its closed position, an eye at each outer corner end of the lower portion of the frame, a looped cable secured to each outer corner end of the bent-over portion of said frame and projecting forwardly through a respective eye on the lower portion of the frame, a substantially wide loop formed on each cable end beyond its respective eye, and means adapted to be actuated by an animal to release the locking means, whereby the bent-over portion of the frame will spring upwardly and rearwardly to draw the looped ends of the cable tightly about said animal, for the purpose specified.

2. In an animal trap, the combination with a frame, one portion of which is adapted to be bent upon the other part, of locking means for holding it in its closed position, an eye at each corner of said frame, a pair of cables, the free ends of said cables projecting through the eyes on the bent-over portion of the frame, and thence projecting forwardly through the eyes on the lower portion of the frame, a clamp, wider than the eyes on the bent-over portion of said frame, for securing said cable ends together between said eyes, a substantially wide loop formed on each cable end beyond its respective eye on the lower portion of the frame, and means adapted to be actuated by an animal to release the locking means, whereby the bent-over portion of the frame will spring upwardly and rearwardly to draw the looped ends of the cable tightly about said animal, for the purpose specified.

3. An animal trap comprising a spring wire bent to form two adjacent portions, a helical coil formed near the middle of each portion of said wire, an eye on each free end of said wire, a transverse rear portion on said wire, an eye formed at each end of said transverse portion, said wire adapted to be bent around its helical portions to bring its transverse rear portion over the eyes on its free ends, means for holding said transverse porton in said position, a pair of cables, the free ends of said cables projecting through the eyes on the bent-over portion of said wire, a clamp, wider than said eyes, for securing said cable ends together between the latter, said cables projecting forwardly through the eyes on the lower portion of said wire, a substantially wide loop formed on each cable beyond its respective eye on the lower portion of the wire, and means adapted to be actuated by the animal to release the locking means, whereby the bent-over portion of the wire will spring upwardly and rearwardly to draw the looped ends of the cables tightly about said animal, for the purpose specified.

In testimony whereof I have hereunto set my hand this 3d day of December, 1920.

WILLIAM DUNN.

Witness:
E. E. UNDERWOOD.